(12) United States Patent
Kwun (10) Patent No.: US 12,539,767 B2
(45) Date of Patent: Feb. 3, 2026

(54) APPARATUS AND METHOD FOR CONTROLLING HEAT GENERATION OF MOTOR

(71) Applicants: Hyundai Motor Company, Seoul (KR); Kia Corporation, Seoul (KR)

(72) Inventor: Sun-Dong Kwun, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 318 days.

(21) Appl. No.: 18/325,691

(22) Filed: May 30, 2023

(65) Prior Publication Data

US 2024/0157806 A1    May 16, 2024

(30) Foreign Application Priority Data

Nov. 16, 2022  (KR) .......................... 10-2022-0153972

(51) Int. Cl.
*B60L 7/18*     (2006.01)
*H02P 29/60*   (2016.01)

(52) U.S. Cl.
CPC .............. *B60L 7/18* (2013.01); *H02P 29/60* (2016.02); *B60L 2240/24* (2013.01); *B60L 2240/423* (2013.01); *B60L 2240/425* (2013.01); *B60L 2240/642* (2013.01); *B60L 2240/662* (2013.01); *B60L 2240/68* (2013.01); *B60L 2250/26* (2013.01)

(58) Field of Classification Search
CPC ...... B60L 7/18; B60L 7/224; B60L 2240/423; B60L 2240/425; B60L 2240/642; B60L 2240/662; B60L 2240/68; B60L 2250/26; B60T 8/176; B60T 13/74; B60T 17/221; B60T 2260/09; B60T 2270/10; B60W 30/12; B60W 40/02; H02P 29/60
See application file for complete search history.

(56) References Cited

U.S. PATENT DOCUMENTS

| | | | | |
|---|---|---|---|---|
| 5,507,153 | A * | 4/1996 | Seto | .................... B60H 1/00492 62/133 |
| 8,052,066 | B2 * | 11/2011 | Watanabe | .......... B60H 1/00764 123/41.1 |
| 8,127,564 | B2 * | 3/2012 | Takamatsu | ............ B60L 3/0053 62/239 |
| 10,392,018 | B1 * | 8/2019 | Rhodes | .................... B60L 58/25 |
| 11,283,088 | B2 * | 3/2022 | Seo | .................... H01M 8/04014 |
| 2010/0235043 | A1 * | 9/2010 | Seta | ........................ B60L 3/0076 701/29.2 |
| 2013/0060409 | A1 * | 3/2013 | Matsushita | ......... B60W 10/184 180/65.23 |

(Continued)

FOREIGN PATENT DOCUMENTS

KR    100428092 B1    7/2004

*Primary Examiner* — Mussa A Shaawat
(74) *Attorney, Agent, or Firm* — SLATER MATSIL, LLP (57) ABSTRACT

A embodiment method of attempting to minimize heat generation of a motor by lowering the heat generation of an electro mechanical brake (EMB) driving motor occurring in an anti-brake system (ABS) operation mode includes determining whether to enter the ABS operation mode in which the heat generation of the motor is to be minimized and in response to a determination to enter the ABS operation mode, initiating the ABS operation mode thereby lowering the heat generation of the EMB driving motor.

18 Claims, 4 Drawing Sheets

(56) References Cited

U.S. PATENT DOCUMENTS

| | | | |
|---|---|---|---|
| 2015/0021981 A1* | 1/2015 | Shimada | B60T 8/176 303/121 |
| 2015/0105951 A1* | 4/2015 | Yu | B60L 7/12 701/22 |
| 2015/0112528 A1* | 4/2015 | Lee | B60L 7/10 701/22 |
| 2015/0233306 A1* | 8/2015 | Mikawa | F02D 13/02 123/90.15 |
| 2016/0137068 A1* | 5/2016 | Nada | B60T 8/172 701/70 |
| 2017/0072931 A1* | 3/2017 | Masuda | F16D 55/226 |
| 2018/0072295 A1* | 3/2018 | Masuda | B60T 7/042 |
| 2019/0193515 A1* | 6/2019 | Takeuchi | B60H 1/00921 |
| 2019/0226263 A1* | 7/2019 | Kishino | B60J 5/10 |
| 2019/0271258 A1* | 9/2019 | Mendez Abrego | F01P 7/164 |
| 2020/0156608 A1* | 5/2020 | Jeon | B60W 30/18127 |
| 2021/0001829 A1* | 1/2021 | Seol | B60T 7/06 |
| 2021/0354277 A1* | 11/2021 | Morimura | B25C 1/06 |
| 2022/0289161 A1* | 9/2022 | Leiber | F16D 61/00 |
| 2022/0363127 A1* | 11/2022 | Okazaki | B60L 7/18 |
| 2023/0331202 A1* | 10/2023 | Saito | B60T 8/17616 |

* cited by examiner

APPARATUS AND METHOD FOR CONTROLLING HEAT GENERATION OF MOTOR

CROSS-REFERENCE TO RELATED APPLICATIONS

This application claims the benefit of Korean Patent Application No. 10-2022-0153972, filed on Nov. 16, 2022, which application is hereby incorporated herein by reference.

TECHNICAL FIELD

The present disclosure relates to an apparatus and method for controlling the heat generation of a motor.

BACKGROUND

Sudden braking causes a lock-up phenomenon on one of the wheels, that is, a phenomenon in which the wheel comes to be locked, in which vehicles are still moving whereas the wheels are completely stopped, and in this case, since the vehicle slides or is pushed sideways, a driver may not properly control a direction of the vehicle.

In order to prevent this problem, a pumping operation of pressing and releasing a brake needs to be performed, and an anti-lock brake system (ABS) is a brake system for performing braking while repeating the pumping operation 10 times or more per second using an electronic control device or a mechanical device.

However, when the ABS is operated on a high-temperature long downhill road, since the electro mechanical brake (EMB) driving motor repeats the driving for braking and releasing the motor due to the quick repetition between a slip control by braking and a release of the braking, there is a problem that the EMB motor may reach a heat generation limit in a process of such operation of the motor being continuously repeated. In addition, in this case, a safety problem, such as the unavailability of braking due to a torque limit of the motor or a function limit of the motor due to seizure of the motor or the like, may occur.

SUMMARY

The present disclosure relates to an apparatus and method for controlling the heat generation of a motor. Particular embodiments relate to an apparatus and method for controlling the heat generation of a motor capable of preventing a reduction in braking performance due to a heat generation limit of an electro mechanical brake (EMB) motor which occurs due to quick repetitions between a slip control by braking and a release of the braking when an anti-lock brake system (ABS) is operated on a high-temperature long downhill road.

Embodiments of the present disclosure may solve problems in the art, and an exemplary embodiment of the present disclosure controls an EMB motor to normally operate without a heat generation limit when an ABS system is operated on a high-temperature long downhill road.

A method of minimizing the heat generation of a motor according to embodiments of the present disclosure minimizes the heat generation of an EMB driving motor occurring in an ABS operation mode and may include determining whether to enter an ABS operation mode in which the heat generation of the motor may be minimized and initiating the ABS operation mode in which the heat generation of the motor may be minimized according to the determination result.

More specifically, in the ABS operation mode in which the heat generation of the motor may be minimized, a stop section maintaining time of the motor may be controlled to minimize the number of repetitions of the drive and stop of the motor by the ABS operation mode.

More specifically, the initiating of the ABS operation mode in which the heat generation of the motor is minimized may include driving the motor, performing a first stop of the motor, performing a first re-driving and a second stop of the motor, and performing a second re-driving and a third stop of the motor.

In this case, in the performing of the first stop of the motor, the first stop of the motor may be performed by a maximum braking force.

In addition, in the performing of the first re-driving and the second stop of the motor, the first re-driving of the motor may be performed by increasing a torque of the motor, and then the second stop of the motor may be performed in a state in which wheel slip control may be maintained by the ABS operation mode.

In addition, in the performing of the second re-driving and the third stop of the motor, the second re-driving of the motor may be performed as the motor is reversely driven to release a braking force, and after the braking force is released, the third stop of the motor may be performed.

More specifically, the initiating of the ABS operation mode in which the heat generation of the motor is minimized may further include forcibly operating a lane keep assistance system (LKAS) in order to minimize a lateral error and a heading angle error.

More specifically, the determining of whether to enter the ABS operation mode in which the heat generation of the motor is minimized may include determining whether a vehicle travels on a long downhill road using information from a longitudinal G sensor, determining whether an outside air temperature exceeds a set value using a temperature sensor unit when the vehicle travels on the long downhill road, determining whether an obstacle is present in front of the vehicle using an adaptive driver assistance system (ADAS) and a radar sensor when the outside air temperature exceeds the set value, and determining whether a turning section is present on a route of the vehicle using information from a navigation system when the obstacle is not present in front of the vehicle.

In this case, the initiating of the ABS operation mode in which the heat generation of the motor is minimized may be performed when the turning section is not present on the route of the vehicle.

In addition, the ABS operation mode may be operated when the obstacle is present in front of the vehicle or when the turning section is present on the route of the vehicle.

More specifically, the determining of whether to enter the ABS operation mode in which the heat generation of the motor is minimized may further include determining whether a driver's intention of sudden braking or maintenance of the sudden braking is present and determining whether the ABS operation mode of the vehicle is operated or whether the maintenance of the ABS operation mode is present.

In this case, a normal braking may be operated when the ABS operation mode is inactive or the maintenance of the ABS operation mode is not present.

In addition, the method of minimizing the heat generation of the motor according to embodiments of the present disclosure may further include measuring the heat generation of the motor after the ABS operation mode in which the heat generation of the motor is minimized is initiated.

In this case, when the heat generation of the motor is out of an allowable range, the ABS braking may be stopped and switched to the normal braking.

An apparatus for minimizing the heat generation of a motor minimizes the heat generation of an EMB driving motor occurring in an ABS operation mode and may include a determinator configured to determine whether to enter an ABS operation mode in which the heat generation of the motor is minimized and a controller configured to control an ABS to operate the ABS operation mode in which the heat generation of the motor is minimized.

More specifically, in the ABS operation mode in which the heat generation of the motor is minimized, the number of repetitions of drive and stop of the motor may be minimized by the ABS operation mode, and the controller may control a stop section maintaining time of the motor.

More specifically, the determinator may include a longitudinal G sensor for determining whether a vehicle travels on a long downhill road, a temperature sensor unit for measuring an outside air temperature, a radar sensor and an ADAS camera for determining whether an obstacle is present in front of the vehicle, and a navigation system for determining whether a turning section is present on a route of the vehicle.

In addition, the apparatus for minimizing the heat generation of the motor according to embodiments of the present disclosure may further include a temperature measuring unit configured to measure a degree of the heat generation of the motor.

More specifically, the controller may control the ABS to maximize a stop section of the motor and minimize a braking distance.

The apparatus and method for minimizing the heat generation of the motor according to embodiments of the present disclosure can minimize the heat generation of the motor generated while the ABS in the EMB braking system for applying the braking force with the motor torque is operated.

DETAILED DESCRIPTION OF ILLUSTRATIVE EMBODIMENTS

Since the present disclosure may have various changes and various embodiments, specific embodiments will be shown in the drawings and described in detail in a detailed description. However, it should be understood that this is not intended to limit the present disclosure to specific embodiments and the embodiments include all modifications, equivalents, or substitutes included in the spirit and technical scope of the present disclosure.

Detailed descriptions of well-known functions and configurations that may unnecessarily obscure the gist of the present disclosure are omitted.

Hereinafter, an apparatus and method for minimizing heat generation of a motor according to embodiments of the present disclosure will be described in detail with reference to the accompanying drawings.

Figure 1:
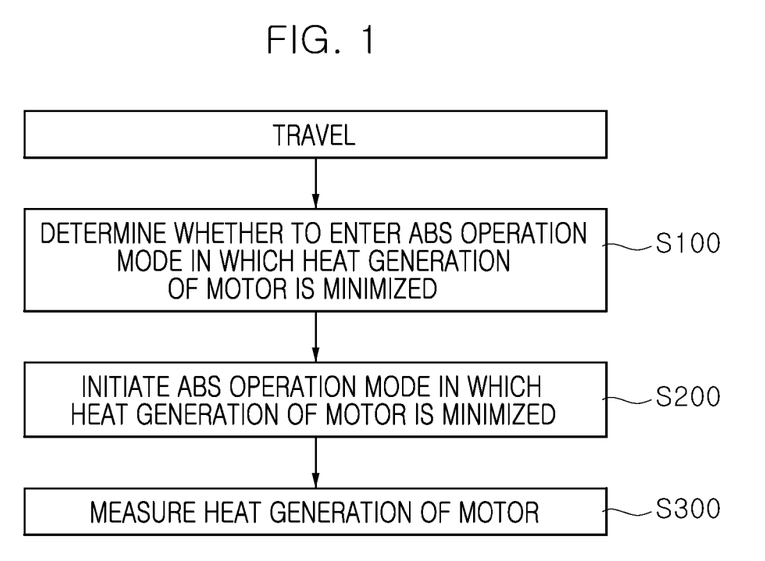
FIG. 1 shows a flowchart of a method of minimizing heat generation of a motor according to an embodiment of the present disclosure.

FIG. 1 shows a flowchart of a method of minimizing the heat generation of a motor according to an embodiment of the present disclosure.

Referring to FIG. 1, a method of minimizing the heat generation of a motor according to an embodiment of the present disclosure may include a method of minimizing the heat generation of an electro mechanical brake (EMB) driving motor generated in an anti-brake system (ABS) operation mode and may include an operation S100 of determining whether to enter the ABS operation mode in which the heat generation of the motor may be minimized and an operation S200 of initiating the ABS operation mode in which the heat generation of the motor may be minimized according to the determination result.

In other words, embodiments of the present disclosure are directed to minimizing the heat generation of the motor generated by repeating the operation and release of the EMB driving motor when the ABS operates in a vehicle to which the EMB braking system rather than a hydraulic braking system is applied.

More specifically, the ABS operation mode in which the heat generation of the motor is minimized is characterized by controlling a stop section maintaining time of the motor so that the number of repetitions of the drive and stop of the motor can be minimized by the ABS operation mode.

In other words, a technical feature is that by newly generating the ABS operation mode in which the heat generation of the motor is minimized, a maximum torque of the EMB driving motor (hereinafter referred to as a "motor") is reduced to lower the basic amount of heat generation and a motor stop period between the operation and stop of the motor may be maximized to minimize a frequency of the frequent operation of the motor, thereby preventing the motor from reaching a heat generation limit.

Figure 2:
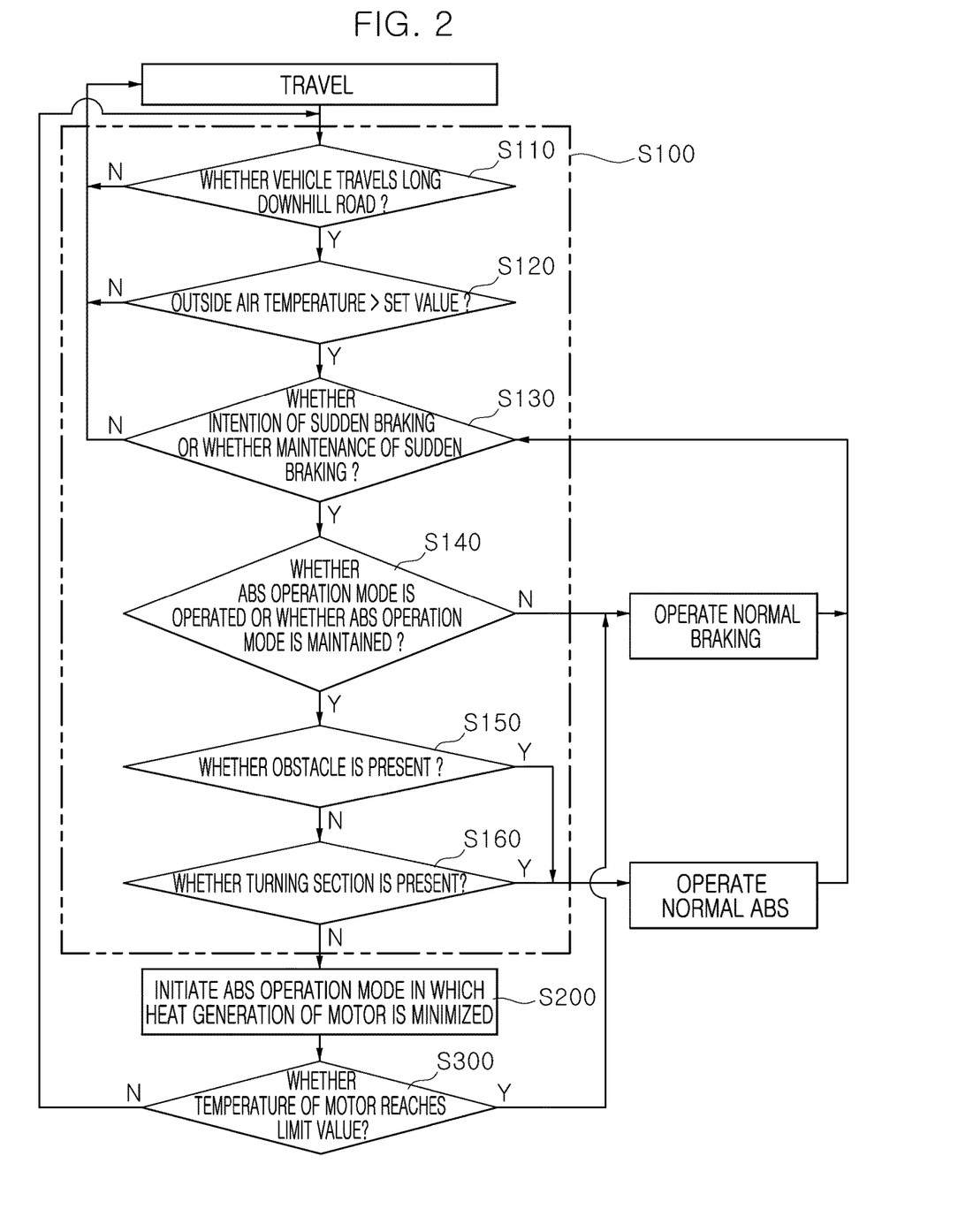
FIG. 2 shows a flowchart of the method of minimizing the heat generation of the motor according to one embodiment of the present disclosure and a flowchart of an operation of determining whether to enter an anti-lock brake (ABS) operation mode in which the heat generation of the motor is minimized in the method of minimizing the heat generation of the motor according to one embodiment of the present disclosure.

FIG. 2 shows a flowchart of the method of minimizing the heat generation of the motor according to one embodiment of the present disclosure and a flowchart of an operation of determining whether to enter an anti-lock brake (ABS) operation mode in which the heat generation of the motor may be minimized in the method of minimizing the heat generation of the motor according to one embodiment of the present disclosure.

Referring to FIG. 2, the operation S100 of determining whether to enter the ABS operation mode in which the heat generation of the motor is minimized may include an operation S110 of determining whether a vehicle travels on a long downhill road using information from a longitudinal G sensor, an operation S120 of determining whether an outside air temperature exceeds a set value using a temperature sensor unit when the vehicle travels on the long downhill road, an operation S150 of determining whether an obstacle is present in front of the vehicle using an adaptive driver assistance system (ADAS) camera and a radar sensor when the outside air temperature exceeds the set value, and an operation S160 of determining whether a turning section is present on a route of the vehicle using information from a navigation system when the obstacle is not present in front of the vehicle.

At this time, when the turning section is not present on the route of the vehicle, the operation S200 of initiating the ABS operation mode in which the heat generation of the motor is minimized may be performed.

In other words, the operation S200 of initiating the ABS operation mode in which the heat generation of the motor is minimized may finally satisfy conditions capable of initiating the ABS operation mode in which the heat generation of the motor is minimized when the vehicle currently travels on the long downhill road in the operation S110 of determining whether the vehicle travels on the long downhill road using the information from the longitudinal G sensor, the current outside air temperature is in a high-temperature state in the operation S120 of determining whether the outside air temperature exceeds the set value using the temperature sensor unit, the obstacle is not present in front of the vehicle in the operation S150 of determining whether the obstacle is present in front of the vehicle using the ADAS camera and the radar sensor, and the turning section is not present on the route of the vehicle in the operation S160 of determining whether the turning section is present on the route of the vehicle using the information from the navigation system.

At this time, the set value in the operation S120 of determining whether the outside air temperature exceeds the set value using the temperature sensor unit is a temperature value used as a reference for high temperature.

In addition, a normal ABS may be operated when the obstacle is present in front of the vehicle or the turning section is present on the route of the vehicle.

In other words, when the obstacle is present in front of the vehicle or the turning section is present on the route of the vehicle, since a driver does not perform sudden braking for sudden deceleration or sudden stop, the normal ABS rather than the ABS operation mode in which the heat generation of the motor is minimized according to embodiments of the present disclosure may be operated.

In addition, more specifically, the operation S100 of determining whether to enter the ABS operation mode in which the heat generation of the motor is minimized may further include an operation S130 of determining whether the driver's intention of sudden braking or the maintenance of the sudden braking is present and an operation S140 of determining whether the ABS operation mode of the vehicle is operated or whether the maintenance of the ABS operation mode is present when the driver's intention of the sudden braking or maintaining the sudden braking is present.

In this case, the normal braking may be operated when the ABS operation mode is inactive or the maintenance of the ABS operation mode is not present.

In this case, normal braking refers to normal braking that fixes a position of the motor rather than braking by the ABS without additional heat generation.

In addition, when the ABS operation mode is operated or the maintenance of the ABS operation mode is present in the operation S140 of determining whether the ABS operation mode of the vehicle is operated or the maintenance of the ABS operation mode is present, the operation S150 of determining whether the obstacle is present in front of the vehicle using the ADAS camera and the radar sensor may be performed.

Figure 3:
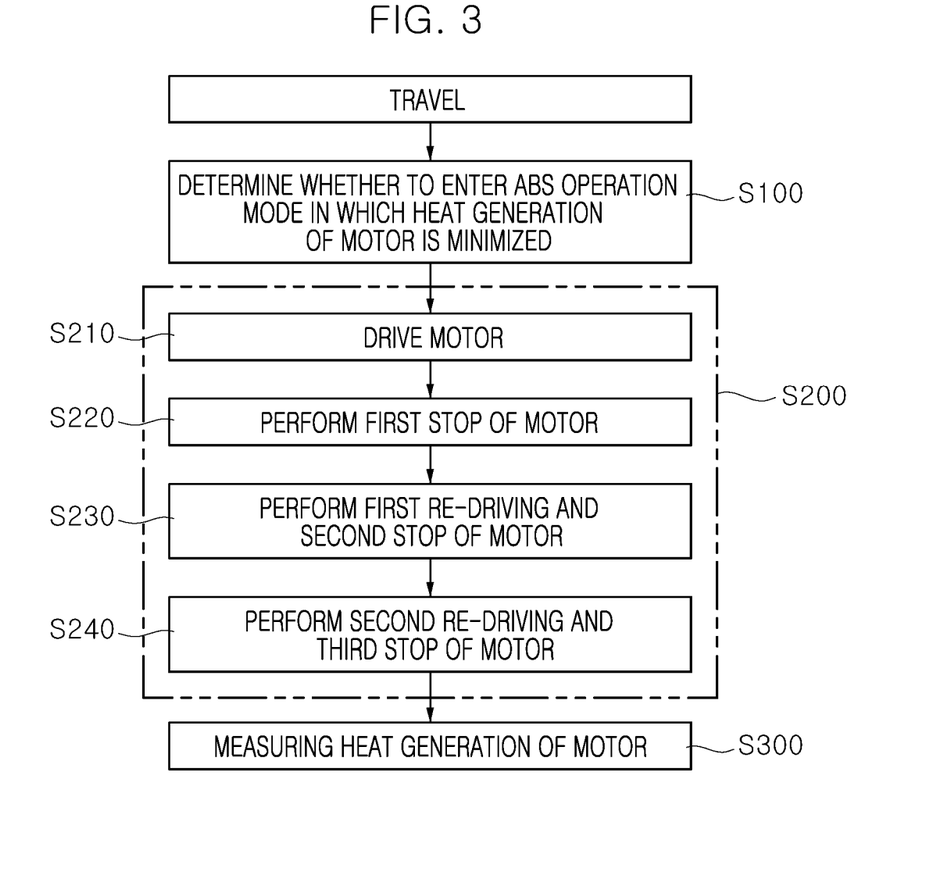
FIG. 3 is a flowchart of the method of minimizing the heat generation of the motor according to one embodiment of the present disclosure and a flowchart of an operation of initiating the ABS operation mode in which the heat generation of the motor is minimized in the method of minimizing the heat generation of the motor according to one embodiment of the present disclosure.

FIG. 3 is a flowchart of the method of minimizing the heat generation of the motor according to one embodiment of the present disclosure and a flowchart of an operation of initiating the ABS operation mode in which the heat generation of the motor is minimized in the method of minimizing the heat generation of the motor according to one embodiment of the present disclosure.

As shown in FIG. 3, the operation S200 of initiating the ABS operation mode in which the heat generation of the motor is minimized may include an operation S210 of driving the motor, an operation S220 of performing a first stop of the motor, an operation S230 of performing a first re-driving and a second stop of the motor, and an operation S240 of performing a second re-driving and a third stop of the motor.

The operation S200 of initiating the ABS operation mode in which the heat generation of the motor is minimized may be repeated according to the control of the ABS, and a detailed description thereof will be given below.

In other words, as described above, referring to FIG. 2 together, since the operation S200 of initiating the ABS operation mode in which the heat generation of the motor is minimized may finally satisfy the conditions capable of initiating the ABS operation mode in which the heat generation of the motor is minimized when the ABS operation mode is operated or the maintenance of the ABS operation mode is present in the operation S140 of determining whether the ABS operation mode of the vehicle is operated or the maintenance of the ABS operation mode is present, the operation S210 of driving the motor eventually means that the motor is driven by the operation of the ABS.

In this case, when the motor is driven, this may cause the driving torque of the motor, and as a result, a stroke change section of a ball screw may occur, that is, the heat generation of the motor may occur.

At this time, the operation S220 of performing the first stop of the motor performs the first stop of the motor by a maximum braking force.

In other words, in order to prevent the heat generation of the motor occurring in the operation S210 of driving the motor from exceeding a limit (allowable range), the operation S220 of performing the first stop of the motor may be performed, and at the same time, in order to prevent the occurrence of a lock-up slip phenomenon (hereinafter referred to as a "slip phenomenon") of the wheel caused by the stop of the motor, the first stop of the motor may be performed by the maximum braking force.

At this time, the ball screw may reach a maximally advanced position and a braking force corresponding thereto may be maintained, and in this case, the motor may be in a stopped state, thereby not causing additional heat generation.

It is preferable that a first stop period of the motor, that is, a period for which the motor is stopped may be maintained as long as possible, but it is preferable to optimize the first stop period in consideration of a braking distance of the vehicle.

In addition, in the operation S230 of performing the first re-driving and the second stop of the motor, the first re-driving of the motor may be performed by increasing the torque of the motor, and then the second stop of the motor may be performed in a state in which the wheel slip control may be maintained by the ABS operation mode.

In other words, in order to control the occurrence of the wheel slip phenomenon, the motor may be re-driven by additionally increasing the torque of the motor after the first stop of the motor, and in this case, the wheel slip phenomenon may be controlled by the general ABS, but since the motor is re-heated, the second stop of the motor may be performed after the first stop of the motor, thereby preventing the occurrence of the additional heat generation of the motor.

In addition, in the operation S240 of performing the second re-driving and the third stop of the motor, the second re-driving of the motor may be performed as the motor is reversely driven in order to release the braking force, and after the braking force is released, the third stop of the motor may be performed.

More specifically, the operation of initiating the ABS operation mode in which the heat generation of the motor is minimized (not shown) may further include an operation of forcibly operating a lane keep assistance system (LKAS) in order to minimize a lateral error and a heading angle error.

In addition, as shown in FIGS. 1 and 2, the method of minimizing the heat generation of the motor according to embodiments of the present disclosure may further include an operation S300 of measuring the heat generation of the motor after the ABS operation mode in which the heat generation of the motor is minimized may be initiated.

In this case, when the heat generation of the motor is out of the allowable range, ABS braking may be stopped and switched to normal braking.

In other words, as shown in FIG. 2, when the heat generation of the motor is out of the allowable range even in the case of the ABS operation mode in which the heat generation of the motor is minimized according to embodiments of the present disclosure, by forcibly releasing the ABS and switching the ABS operation mode to the normal braking mode capable of securing the braking force even in a stopped state of the motor that is a state in which the motor does not generate an additional torque, it is possible to block the additional heat generation of the motor that may occur.

Figure 4:
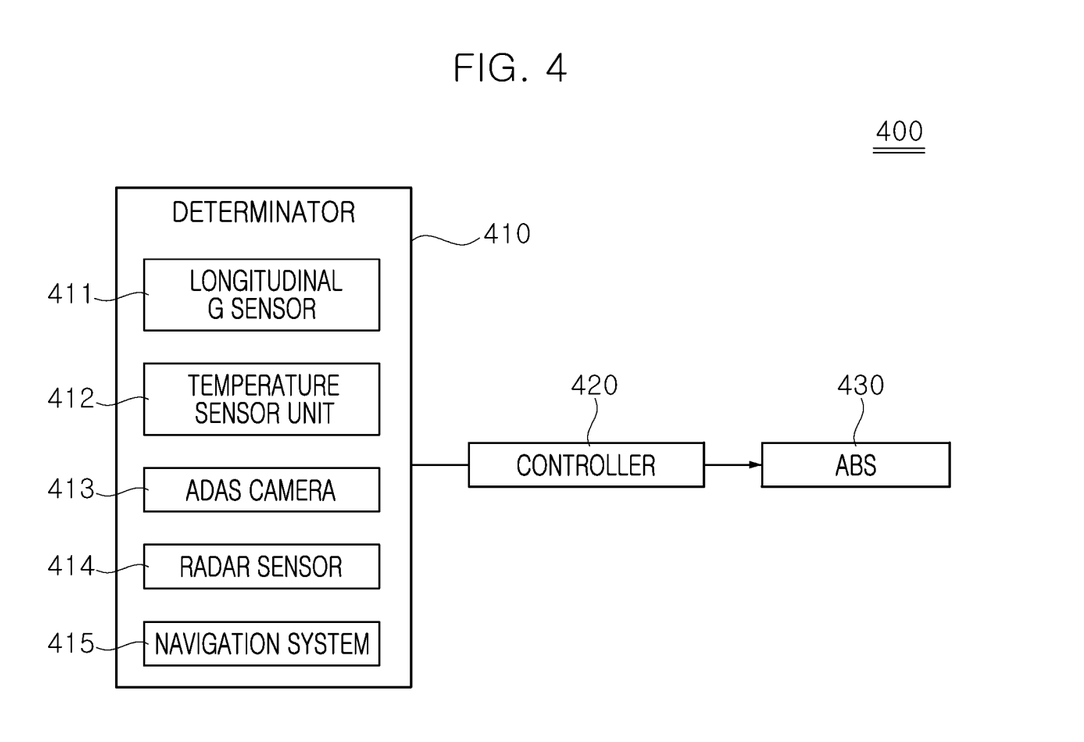
FIG. 4 shows an apparatus for minimizing the heat generation of the motor according to one embodiment of the present disclosure.

FIG. 4 shows an apparatus for minimizing the heat generation of the motor according to one embodiment of the present disclosure.

Referring to FIG. 4, an apparatus for minimizing the heat generation of a motor according to embodiments of the present disclosure is an apparatus 400 for minimizing the heat generation of the motor occurring in an ABS operation mode and may include a determinator 410 for determining whether to enter the ABS operation mode in which the heat generation of the motor may be minimized and a controller 420 for controlling an ABS 430 to operate the ABS operation mode in which the heat generation of the motor may be minimized.

In other words, an embodiment of the present disclosure minimizes the heat generation of the motor caused by repeating the continuous operation and release of the motor when the ABS 430 operates in a vehicle to which an EMB braking system rather than a hydraulic braking system may be applied.

More specifically, in the ABS operation mode in which the heat generation of the motor is minimized, the number of repetitions of drive and stop of the motor may be minimized by the ABS operation mode, and the controller 420 controls a stop section maintaining time of the motor.

In other words, a technical feature of embodiments is that by newly generating the ABS operation mode in which the heat generation of the motor may be minimized, the controller 420 reduces a maximum torque of the EMB driving motor (hereinafter referred to as a "motor") to reduce the basic amount of heat generation and maximizes the motor stop period between the operation and stop of the motor in order to minimize a frequency of the frequent operation of the motor, thereby preventing the motor from reaching the heat generation limit.

More specifically, the determinator 410 includes a longitudinal G sensor 411 for determining whether a vehicle travels on a long downhill road, a temperature sensor unit 412 for measuring an outside air temperature, a radar sensor 414 and an ADAS camera 413 for determining whether an obstacle is present in front of the vehicle, and a navigation system 415 for determining whether a turning section is present on a route of the vehicle.

More specifically, the controller 420 controls the ABS 430 to maximize the stop section of the motor and minimize the braking distance.

In other words, as described above, when it is determined that the vehicle currently travels on the long downhill road by the longitudinal G sensor 411, the outside air temperature exceeds a set value and corresponds to a high temperature by the temperature sensor unit 412, the obstacle is present in front of the vehicle by the radar sensor 414 and the ADAS camera 413, and the turning section is not present on the route of the vehicle by the navigation system 415, the controller 420 finally controls the ABS 430 to operate the ABS operation mode in which the heat generation of the motor may be minimized, that is, maximize the stop section of the motor and minimize the braking distance.

In addition, the apparatus for minimizing the heat generation of the motor according to embodiments of the present disclosure may further include a temperature measuring unit (not shown) for measuring a degree of the heat generation of the motor.

In other words, when the temperature measuring unit measures that the degree of the heat generation of the motor exceeds the set value, as described above, the controller 420 may forcibly release the ABS 430 and control the ABS operation mode to be switched to the normal braking mode capable of securing the braking force even in the stopped state of the motor that is a state in which the motor does not generate the additional torque.

Although the present disclosure has been described above with reference to the embodiments shown in the drawings, this is only for describing exemplary embodiments of the present disclosure, and those skilled in the art to which the present disclosure pertains may understand that various modifications or equivalent embodiments are possible from the detailed description of the present disclosure.

Therefore, the true scope of the present disclosure should be determined by the technical spirit of the claims.

What is claimed is:

1. A method of attempting to minimize heat generation of a motor by lowering heat generation of an electro mechanical brake (EMB) driving motor occurring in an anti-brake system (ABS) operation mode, the method comprising:

determining whether to enter the ABS operation mode in which the heat generation of the motor is to be minimized; and in response to a determination to enter the ABS operation mode, initiating the ABS operation mode, thereby lowering the heat generation of the EMB driving motor, wherein, in the ABS operation mode:

a stop section maintaining time of the motor is controlled to lower a number of repetitions of driving and stopping of the motor by the ABS operation mode, and a maximum torque of the motor is reduced to lower a basic amount of the heat generation and a motor stop period between an operation and stop of the motor is maximized to minimize a frequency of a frequent operation of the motor, thereby preventing the motor from reaching a heat generation limit.

2. The method of claim 1, wherein initiating the ABS operation mode in which the heat generation of the motor is to be minimized comprises:
driving the motor;
performing a first stop of the motor;
performing a first re-driving;
performing a second stop of the motor; and
performing a second re-driving and performing a third stop of the motor.

3. The method of claim 2, wherein performing the first stop of the motor comprises performing a maximum braking force.

4. The method of claim 2, wherein:
performing the first re-driving of the motor comprises increasing a torque of the motor, and
the second stop of the motor is performed in a state in which wheel slip control is maintained by the ABS operation mode.

5. The method of claim 2, wherein:
the second re-driving is performed as the motor is reversely driven to release a braking force, and
the third stop of the motor is performed after the braking force is released.

6. The method of claim 2, wherein initiating the ABS operation mode in which the heat generation of the motor is to be minimized further comprises forcibly operating a lane keep assistance system in order to minimize a lateral error and a heading angle error.

7. The method of claim 1, wherein determining whether to enter the ABS operation mode comprises:
determining whether a vehicle travels on a long downhill road using information from a longitudinal G sensor;
in response to a determination that the vehicle travels on the long downhill road, determining whether an outside air temperature exceeds a set value;
in response to a determination that the outside air temperature exceeds the set value, determining whether an obstacle is present in front of the vehicle using an adaptive driver assistance system (ADAS) and a radar sensor; and
in response to a determination that the obstacle is not present in front of the vehicle, determining whether a turning section is present on a route of the vehicle using information from a navigation system.

8. The method of claim 7, wherein initiating the ABS operation mode in which the heat generation of the motor is minimized is performed in response to a determination that the turning section is not present on the route of the vehicle.

9. The method of claim 7, wherein, in response to a determination that the obstacle is present in front of the vehicle or the turning section is present on the route of the vehicle, the ABS operation mode is operated.

10. The method of claim 7, wherein determining whether to enter the ABS operation mode in which the heat generation of the motor is minimized further comprises:
determining whether an intention of a driver of a sudden braking or maintenance of the sudden braking is present; and
determining whether the ABS operation mode of the vehicle is operated or whether maintenance of the ABS operation mode is present.

11. The method of claim 10, wherein in response to a determination that the ABS operation mode is not operated or the maintenance of the ABS operation mode is not present, normal braking is performed.

12. The method of claim 1, further comprising measuring the heat generation of the motor after the ABS operation mode in which the heat generation of the motor is minimized is initiated.

13. The method of claim 12, wherein in response to a determination that the heat generation of the motor is outside of an allowable range, the ABS braking is stopped and switched to normal braking.

14. An apparatus for controlling heat generation of a motor, the apparatus comprising:
a plurality of sensors configured to determine whether to enter an anti-lock brake system (ABS) operation mode in which the heat generation of the motor is to be minimized; and
a controller configured to control an ABS to operate the ABS operation mode in which the heat generation of the motor is lowered by lowering heat generation of an electro mechanical brake (EMB) driving motor,
wherein, in the ABS operation mode:
a stop section maintaining time of the motor is controlled to lower a number of repetitions of driving and stopping of the motor by the ABS operation mode, and
a maximum torque of the motor is reduced to lower a basic amount of the heat generation and a motor stop period between an operation and stop of the motor is maximized to minimize a frequency of a frequent operation of the motor, thereby preventing the motor from reaching a heat generation limit.

15. The apparatus of claim 14, wherein the controller is configured to control the stop section maintaining time of the motor.

16. The apparatus of claim 14, wherein the plurality of sensors comprises:
a longitudinal G sensor configured to determine whether a vehicle travels on a long downhill road;
a temperature sensor unit configured to measure an outside air temperature;
a radar sensor and an Advanced Driver-Assistance System (ADAS) camera configured to determine whether an obstacle is present in front of the vehicle; and
a navigation system configured to determine whether a turning section is present on a route of the vehicle.

17. The apparatus of claim 14, further comprising a temperature measuring unit configured to measure a degree of the heat generation of the motor.

18. The apparatus of claim 14, wherein the controller is configured to control the ABS to maximize a stop section of the motor and minimize a braking distance.

* * * * *